US008773738B2

(12) United States Patent
Toki et al.

(10) Patent No.: US 8,773,738 B2

(45) Date of Patent: Jul. 8, 2014

(54) PAPER PROCESSING APPARATUS

(75) Inventors: Akihiko Toki, Kinokawa (JP); Masasuke Funase, Kinokawa (JP); Hideki Oiwa, Kinokawa (JP)

(73) Assignee: Duplo Seiko Corporation, Kinokawa-Shi, Wakayama (JP)

( * ) Notice: Subject to any disclaimer, the term of this patent is extended or adjusted under 35 U.S.C. 154(b) by 0 days.

(21) Appl. No.: 13/579,477

(22) PCT Filed: Mar. 23, 2011

(86) PCT No.: PCT/JP2011/056987

§ 371 (c)(1), (2), (4) Date: Nov. 12, 2012

(87) PCT Pub. No.: WO2011/118637

PCT Pub. Date: Sep. 29, 2011

(65) Prior Publication Data

US 2013/0057930 A1 Mar. 7, 2013

(30) Foreign Application Priority Data

Mar. 25, 2010 (JP) .............................. P2010-070471

(51) Int. Cl.
*H04N 1/04* (2006.01)

(52) U.S. Cl.
USPC ........... 358/498; 358/474; 358/496; 358/488; 271/227; 399/303

(58) Field of Classification Search
CPC .......... H04N 2201/04703; H04N 2201/04755; H04N 1/00031; H04N 1/00087; H04N 1/00795; H04N 1/12; H04N 2201/04793; H04N 1/00082; G06T 7/0085
USPC ......... 358/474, 396, 302, 501, 498, 496, 488, 358/449; 271/227, 225, 226, 254, 177; 399/303, 45, 81
See application file for complete search history.

(56) References Cited

U.S. PATENT DOCUMENTS 5,309,182 A * 5/1994 Mama et al. .................. 347/117
5,480,131 A * 1/1996 Furukawa et al. ........... 271/9.06

(Continued)

FOREIGN PATENT DOCUMENTS

JP 09-071361 3/1997
JP 09-272653 A 10/1997

(Continued)

OTHER PUBLICATIONS

International Search Report (PCT/ISA/210) mailed on May 17, 2011, by the Japanese Patent Office as the International Searching Authority for International Application No. PCT/JP2011/056987.

(Continued)

*Primary Examiner* — Negussie Worku

(74) *Attorney, Agent, or Firm* — Buchanan Ingersoll & Rooney PC

(57) ABSTRACT

A paper processing apparatus equipped with a paper transferor for sequentially transferring paper sheets while maintaining a predetermined interval between a certain paper sheet and the next paper sheet; a paper position detector for detecting the position of a paper sheet; a plurality of processors for performing processing for the paper sheet; an information reader for reading information relating to processing to be performed for the paper sheet; and a controller for controlling operations relating to the paper transferor, the paper position detector, the plurality of processors, and the information reader, wherein upon judging that the certain paper sheet has passed through a certain processor, the controller carries out control to adjust the widthwise position of the certain processor so as to be adapted for the processing for the next paper sheet.

8 Claims, 7 Drawing Sheets

(56) References Cited

U.S. PATENT DOCUMENTS

| | | | | | |
|---|---|---|---|---|---|
| 5,734,758 | A * | 3/1998 | Yamamoto et al. | 382/274 |
| 5,934,661 | A * | 8/1999 | Kameyama | 271/4.08 |
| 6,040,923 | A * | 3/2000 | Takashimizu et al. | 358/498 |
| 6,041,213 | A * | 3/2000 | Yanagi | 399/401 |
| 6,386,080 | B1 | 5/2002 | Okamoto et al. | |
| 6,805,425 | B2 * | 10/2004 | Hayashi et al. | 347/16 |
| 7,502,147 | B2 * | 3/2009 | Suzuki et al. | 358/504 |
| 7,848,696 | B2 * | 12/2010 | Peng et al. | 399/395 |
| 7,918,521 | B2 * | 4/2011 | Furuya et al. | 347/10 |
| 8,104,761 | B2 * | 1/2012 | Seto et al. | 271/9.01 |
| 2006/0145415 | A1 * | 7/2006 | Oota et al. | 271/264 |
| 2007/0159125 | A1 | 7/2007 | Aoyama et al. | |
| 2009/0166945 | A1 | 7/2009 | Taguchi et al. | |

FOREIGN PATENT DOCUMENTS

| | | | |
|---|---|---|---|
| JP | 2000-153953 | A | 6/2000 |
| JP | 2001-026360 | A | 1/2001 |
| JP | 2001-232700 | A | 8/2001 |
| JP | 2005-239307 | A | 9/2005 |
| JP | 2006-016131 | A | 1/2006 |
| JP | 2007-188246 | A | 7/2007 |
| JP | 2009-018913 | | 1/2009 |
| JP | 2009-155109 | A | 7/2009 |

OTHER PUBLICATIONS

Office Action issued on Sep. 10, 2013, by the Japanese Patent Office in corresponding Japanese Patent Application No. 2010-070471. (6 pages).

Notification of Reason for Refusal issued in corresponding Japanese Patent Application No. 2010-070471, dated Dec. 3, 2013, and English translation.

* cited by examiner

PAPER PROCESSING APPARATUS

TECHNICAL FIELD

The present invention relates to a paper processing apparatus that performs various kinds of processing for paper sheets while transferring the paper sheets.

BACKGROUND ART

Paper processing apparatuses are known that perform various kinds of processing, such as cutting, creasing, and perforating, for paper sheets while transferring the paper sheets.

For example, Patent Document 1 discloses an apparatus that reads the positions of cut marks printed on paper sheets, one by one, automatically corrects cutting positions on the basis of the positions of the cut marks, and cuts the paper sheets.

In addition, Patent Document 2 discloses an apparatus in which processing units having processing means configured so as to be movable to any desired positions are detachably installed in the body of the apparatus.

PRIOR ART DOCUMENT

Patent Document

Patent Document 1: Japanese Patent Application Laid-Open Publication No. 2001-232700

Patent Document 2: Japanese Patent Application Laid-Open Publication No. 2005-239307

GENERAL DESCRIPTION OF THE INVENTION

Problem to be Solved by the Invention

According to Patent Documents 1 and 2, until all the processing for a preceding paper sheet in the transfer direction is completed, preparation for processing and actual processing for the next paper sheet in the transfer direction cannot be performed, and the next paper sheet is in a standby state on the upstream side of the paper transfer path. As a result, the transfer interval between the paper sheets becomes long and the processing capability per time is lowered. Furthermore, as the number of processing steps to be performed during paper transfer increases, the problem that the processing capability per time is lowered becomes significant.

Furthermore, in the cut mark reading section for reading cut marks, since the cut marks are read by line scanning using a CCD sensor or the like, there is naturally a limit in increasing the paper transfer speed in the cut mark reading section. Furthermore, since a common transfer drive source is used for the processing means for performing various kinds of processing and for the cut mark reading section, the reading and transfer operation in the card mark reading section determines the speed of the entire apparatus, and there is a problem that it is difficult to increase the paper transfer speed of the entire apparatus.

Accordingly, the technical problem to be solved by the invention is to provide a paper processing apparatus capable of performing processing at high speed by enhancing processing capability per time.

Means for Solving the Problem

For the purpose of solving the above-mentioned technical problems, the present invention provides a paper processing apparatus described below.

More specifically, a paper processing apparatus according to claim 1 of the present invention is equipped with:

paper transferring means for sequentially transferring paper sheets along a paper transfer path while maintaining a predetermined interval between a certain paper sheet and the next paper sheet, paper position detecting means for detecting the position of a paper sheet on the paper transfer path by detecting the leading end or the trailing end of the paper sheet supplied from paper-feeding means, a plurality of processing means, disposed on the paper transfer path, for performing predetermined processing for the paper sheet, information reading means for reading information relating to processing to be performed for the paper sheet using the processing means, and controlling means for controlling operations relating to the paper transferring means, the paper position detecting means, the plurality of processing means, and the information reading means, wherein upon judging that the certain paper sheet has passed through a certain processing means on the basis of the position of the paper sheet detected using the paper position detecting means, the controlling means carries out control to adjust the widthwise position of the certain processing means so as to be adapted for the processing for the next paper sheet.

In the paper processing apparatus according to claim 2 of the present invention, the paper position detecting means is disposed on the upstream side of the information reading means.

In the paper processing apparatus according to claim 3 of the present invention, auxiliary paper position detecting means is disposed appropriately in the leading end section or the trailing end section of the processing means.

In the paper processing apparatus according to claim 4 of the present invention, paper transfer drive sources for the paper-feeding means, the information reading means, and the processing means are independent of one another.

In the paper processing apparatus according to claim 5 of the present invention, the reading operation using the information reading means is performed while the paper sheet is transferred.

In the paper processing apparatus according to claim 6 of the present invention, the paper transfer using the paper transferring means is performed at the highest speed until the leading end or the trailing end of the paper sheet is detected using the paper position detecting means, and the paper transfer using the paper transferring means is performed in a state in which the transfer speed is reduced to a speed at which reading using the information reading means is possible after the leading end or the trailing end of the paper sheet is detected using the paper position detecting means.

In the paper processing apparatus according to claim 7 of the present invention, the processing means are configured as so as to be detachable from the body of the apparatus.

Effect of the Invention

With the present invention according to claim 1, if the controlling means judges that a certain paper sheet has passed through a certain processing means on the basis of the paper position detected using the paper position detecting means, control is carried out to adjust the widthwise position of the certain processing means so as to be adapted for the processing for the next paper sheet. Hence, there is an effect that the paper sheets to be processed sequentially can be transferred sequentially at short intervals, and processing capability per time is enhanced.

With the present invention according to claim 2, on the basis of the paper position detected using the paper position detecting means, various kinds of operations (for example, a reading operation using the information reading means and processing operations using the plurality of processing means) are performed on the downstream side of the detected paper position. Hence, there is an effect that the number of components to be used is reduced.

As described above, on the basis of the paper position detected using the paper position detecting means, the paper position on the paper transfer path can be determined uniquely. However, as the paper transfer path becomes longer, the accumulation of the positional displacement (transfer error) of the paper sheet in the lengthwise direction may occur more frequently. Hence, with the present invention according to claim 3, the paper position information obtained using the paper position detecting means is corrected, whereby there is an effect that the paper position information can be made more accurate.

Conventionally, a single drive source is used to perform paper transfer for the entire paper transfer path. In this configuration, the paper transfer speed to be required is different depending on the processing to be performed in each region of the paper transfer path, and the paper transfer speeds in the regions adjacent to each other interfere with each other, whereby the paper transfer speeds in the regions are lowered sometimes. Furthermore, since the paper transfer speed of the entire apparatus is determined so as to be equal to the lowest paper transfer speed, there is a problem that the paper transfer speed of the entire apparatus is lowered. Hence, with the present invention according to claim 4, the paper transfer speed in each region of the paper transfer path is optimized, whereby there is an effect that the paper transfer speed of the entire apparatus is increased.

Moreover, conventionally, in the case that a line scanner, such as a CCD sensor, is used to read the image of a cut mark or the like, an operation is repeated in which paper transfer is stopped temporarily each time one line is read and paper transfer is resumed after the one line is read. In other words, the so-called closed control is performed for the reading using the line scanner. As a result, there is a problem that the time required for the scanning is very long. Hence, with the present invention according to claim 5, the so-called open control is carried out for the reading using the information reading means, such as a line scanner, by setting the paper transfer speed so as to be equal to the integral multiple of the line-scanning reading speed, whereby there is an effect that the reading time of the information reading means is shortened.

Since the simplest paper-feeding operation is performed only in the paper-feeding region located on the upstream side of the paper transfer path, the paper transfer speed can be set to the highest speed. On the other hand, in the reading region in which line scanning is performed using the information reading means, such as a CCD sensor, reading operation taking a very long time is performed as described above, and the paper transfer speed cannot be increased. Hence, with the present invention according to claim 6, the paper transfer speed is optimized, whereby there is an effect that processing capability per time is improved.

Slitting, cutting, perforating, creasing, corner cutting, etc. are performed for paper processing. In the case that the above-mentioned various kinds of processing are combined appropriately depending on the processing to be performed by the user, necessary processing and unnecessary processing are present. If processing means are fixedly incorporated in the apparatus so that all the processing can be performed, the paper transfer path becomes long, and the apparatus becomes large in size. Furthermore, processing devices for performing the processing become worn and are required to be replaced sometimes. Hence, with the present invention according to claim 7, there is an effect that operation is flexible, the apparatus is made compact, and replacement work is facilitated.

MODES FOR CARRYING OUT THE INVENTION

A paper processing apparatus 1 according to an embodiment of the present invention will be described below in detail referring to FIGS. 1 to 9. In the present invention, the direction parallel with a paper transfer direction T in which a paper sheet 100 is transferred is described as "an X-direction or a lengthwise direction" (or simply described as "lengthwise"), the direction orthogonal to the paper transfer direction T and parallel with the face of the paper sheet is described as "a Y-direction or a widthwise direction" (or simply described as "widthwise"), and the direction orthogonal to the paper transfer direction T and orthogonal to the face of the paper sheet is described as "a Z-direction or a height direction." The paper-feeding side of the paper transfer direction T is described as an "upstream side" and the paper-discharging side of the paper transfer direction T is described as "a downstream side."

Figure 1:
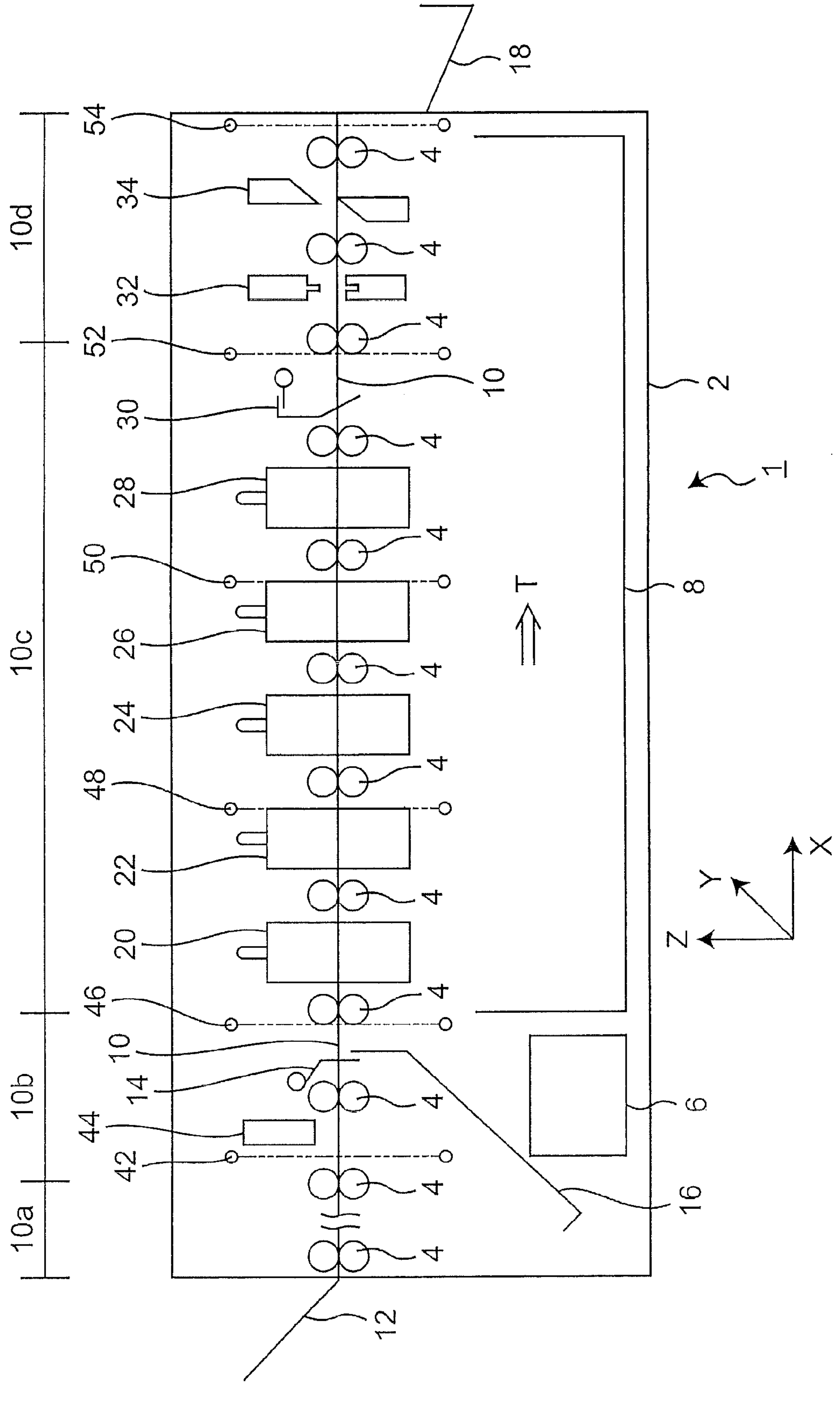
FIG. 1 is a vertical sectional view schematically showing the overall configuration of a paper processing apparatus according to an embodiment of the present invention.

As shown in the overall configuration view of FIG. 1, the paper processing apparatus 1 is equipped with a paper-feeding tray 12 and a paper-discharging tray 18 on the upstream side and the downstream side of the paper transfer path 10 of the apparatus body 2 thereof, respectively.

The apparatus body 2 is equipped with a suction transfer belt to feed the paper sheets 100 loaded in the paper-feeding tray 12 to the apparatus body 2, one by one. As shown in FIG. 1, inside the apparatus body 2, the paper sheets 100 are transferred using paper transferring means formed of a plurality of pairs of rollers 4 that are driven by a plurality of transfer motors (described later in detail) being independent for each predetermined region. Hence, the plurality of pairs of rollers 4 are disposed so as to be arranged in the X-direction, whereby the paper transfer path 10 extending in the X-direction is formed. Along the X-direction (lengthwise direction), the paper transfer path 10 has a paper-feeding region 10*a* for transferring the paper sheets 100 from the paper-feeding tray 12 to the apparatus body 2; a reading region 10*b* for reading image information on the paper sheets 100 using a CCD sensor 44; a preprocessing region 10*c* for processing the paper sheets 100 mainly in the X-direction (lengthwise direction); and a post-processing region 10*d* for processing the paper sheets 100 in the Y-direction (widthwise direction).

Figure 3:
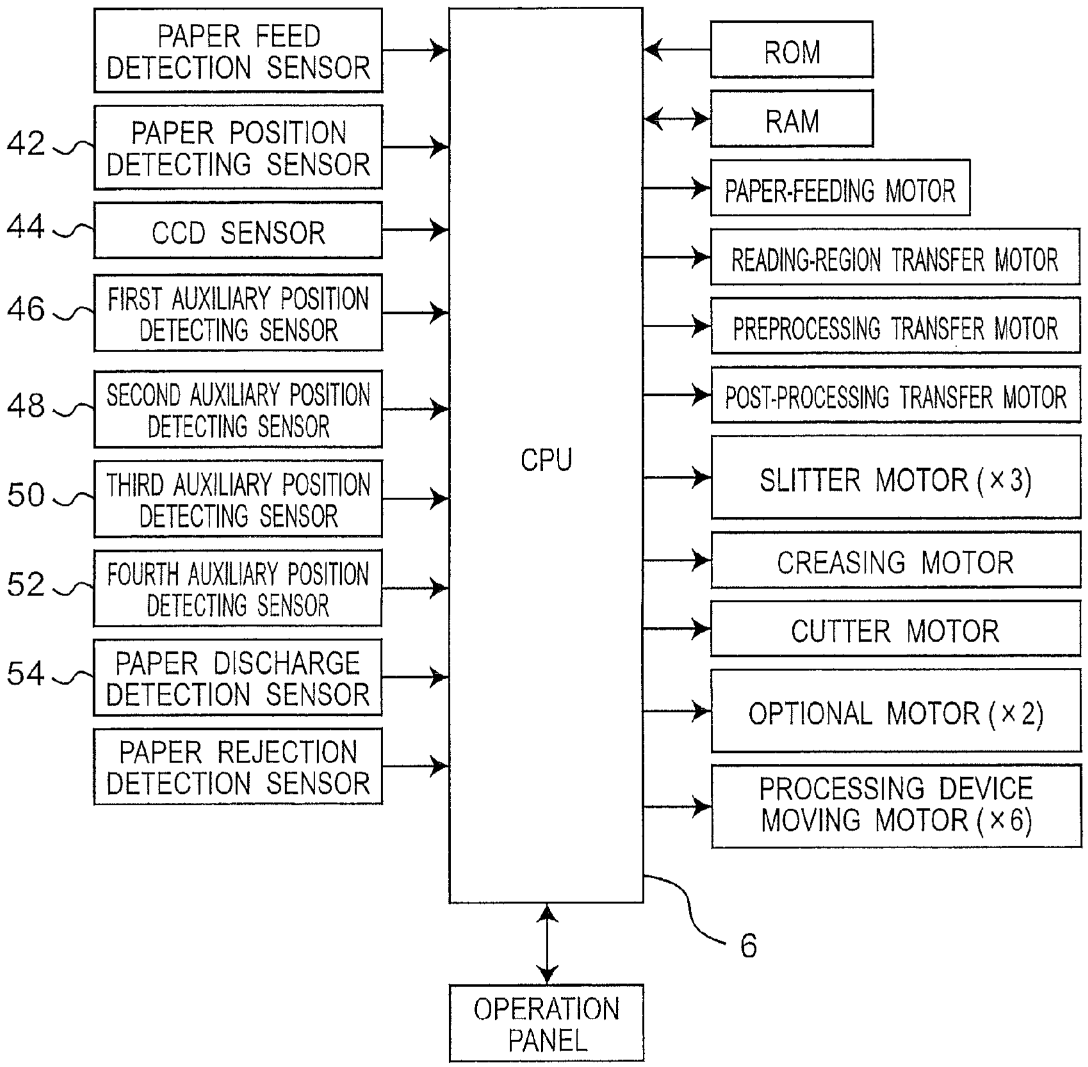
FIG. 3 is a block diagram showing the paper processing apparatus shown in FIG. 1.

The apparatus body 2 of the paper processing apparatus 1 is equipped with controlling means 6 for controlling various kinds of operations of the apparatus. FIG. 3 is a function block diagram relating to the controlling means 6 of the paper processing apparatus 1. A CPU (central processing unit) 6 serving as controlling means carries out control to perform various kinds of arithmetic operations, processing, and judgments via a ROM (read-only memory) in which various kinds of programs are stored, a RAM (random access memory) in which various kinds of information are stored, and various kinds of input devices and output devices.

The ROM (flash ROM), the RAM, various kinds of sensors 42, 44, 46, 48, 50, 52, and 54 serving as input devices, various kinds of motors serving as output devices, and an operation panel serving as an input device are respectively connected electrically to the CPU 6. The size information of the paper sheet, the position information of a position mark 106 and various kinds of processing information based on the image of the position mark 106 and the image of a bar code 108 detected using the CCD sensor 44, and paper position information obtained when the leading end section or the trailing end section of the paper sheet 100 passes through a paper position detecting sensor 42 and auxiliary position detecting sensors 46, 48, 50, and 52 are input to the CPU 6, and these various kinds of information are temporarily stored in the RAM.

The paper processing apparatus 1 is equipped with paper transfer drive sources, such as a paper-feeding motor, a reading-region transfer motor, a preprocessing transfer motor, and a post-processing transfer motor; and paper processing drive sources, such as slitter motors, a creasing motor, a cutter motor, optional motors, and processing device moving motors.

The paper-feeding motor is a drive source for driving the suction transfer belt in the paper-feeding region 10*a*. The reading-region transfer motor is a drive source for rotating a group of rollers 4 disposed on the upstream side and/or downstream side (that is, the reading region 10*b*) of the CCD sensor 44. The preprocessing transfer motor is a drive source for rotating a group of rollers 4 disposed from the upstream side of a first optional processing unit 20 to the downstream side (that is, the preprocessing region 10*c*) of a cutting wastage dropping section 30. The post-processing transfer motor is a drive source for rotating a group of rollers 4 disposed from the upstream side of a widthwise creasing section 32 to the downstream side (that is, the post-processing region 10*d*) of a widthwise cutting section 34. Alternatively, it may be possible to use a configuration in which the preprocessing transfer motor rotates a group of rollers 4 disposed from the upstream side of the first optional processing unit 20 to the upstream side (that is, part of the preprocessing region 10*c*) of a third slitting unit 26, and the post-processing transfer motor rotates a group of rollers 4 disposed from the downstream side of the third slitting unit 26 to the downstream side of the widthwise cutting section 34 (that is, part of the preprocessing region 10*c* and the post-processing region 10*d*).

The slitter motor is a drive source for rotating slitting devices (a rotary upper blade and a rotary lower blade) when lengthwise cutting is performed. The creasing motor is a drive source for driving a creasing upper mold 32*a* in the Z-direction when the creasing upper mold 32*a* having a convex section 32*b* is pressed into a creasing lower mold 32*g* having a concave section 32*h*. The cutter motor is a drive source for driving an upper blade in the Z-direction so that the upper blade is pressed toward a lower blade. The optional motors are drive sources for driving various kinds of optional processing devices 20*a* and 28*a* incorporated in the optional cutting units 20 and 28, respectively. The processing device moving motors are drive sources for driving, for example, the processing devices 22*a*, 24*a*, and 26*a* of the cutting units 22, 24, and 26 arranged in the lengthwise direction and extending in parallel with the Y-direction to move the processing devices in the Y-direction.

Specific paper transfer speeds, not limiting the scope of protection of the present invention, are given as examples. The paper transfer speed in the reading region 10*b* driven using the reading-region transfer motor is 70 to 700 mm/sec. The paper transfer speed in the preprocessing region 10*c* driven using the preprocessing transfer motor is 70 to 700 mm/sec. The paper transfer speed in the post-processing region 10*d* driven using the preprocessing transfer motor is 70 to 700 mm/sec. As described later, the paper transfer using the reading region transfer motor is performed at the highest speed until the leading end or the trailing end of the paper sheet 100 is detected using the paper position detecting sensor 42, and the paper transfer using the reading region transfer motor is performed in a state in which the transfer speed is reduced to a speed at which reading using the CCD sensor 44 is possible after the leading end or the trailing end of the paper sheet 100 is detected using the paper position detecting sensor 42.

In the preprocessing region 10*c* of the paper transfer path 10, a certain paper sheet and the next paper sheet following the certain paper sheet are transferred with a certain interval is maintained therebetween. The appropriate interval between the certain paper sheet and the next paper sheet to be transferred in the preprocessing region 10*c* is a distance corresponding to the X-direction (lengthwise) size of the cutting units 20, 22, 24, 26, and 28 in consideration of the safety of paper transfer. The cutting units 20, 22, 24, 26, and 28 are disposed at equal intervals in the X-direction (lengthwise direction) in the preprocessing region 10*c*. The minimum interval between a certain paper sheet and the next paper sheet to be transferred in the preprocessing region 10*c* is a distance obtained by adding the distance moved during the time required for the Y-direction (widthwise) positioning movement of the processing devices (for example, the rotary blades of the slitting units 22, 24, and 26) to the distance corresponding to the X-direction (lengthwise) size of the cutting devices included in the cutting units 20, 22, 24, 26, and 28.

The reading region transfer motor, the preprocessing transfer motor, the post-processing transfer motor, the slitter motors, the creasing motor, the cutter motor, the optional motors, and the processing device moving motors are stepping motors that rotate step by step when a pulse signal is given. The stepping motors are used so that the transfer position of the paper sheet 100 and the movement positions of the various kinds of processing devices can be controlled at high speed and with high accuracy.

A plurality of processing means (processing units and processing sections) are disposed at appropriate positions along the paper transfer path 10. In the embodiment shown in FIG. 1, the first optional processing unit 20, the first slitting (lengthwise cutting) unit 22, the second slitting (lengthwise cutting) unit 24, the third slitting (lengthwise cutting) unit 26, the second optional processing unit 28, the cutting wastage dropping section 30, the widthwise creasing (widthwise folding) section 32, and the widthwise cutting section 34 are respectively provided from the upstream side to the downstream side of the paper transfer path 10. These processing means are detachably installed in the apparatus body 2 as units to allow flexible operation, to reduce the size of the apparatus and to facilitate replacement work, although the processing means may be installed so as to be fixed to the apparatus body 2. The cutting units 20, 22, 24, 26, and 28 are configured so as to have the same dimensions and the same shape in appearance so that they can be attached and detached at any installation positions.

The first optional processing unit 20 is a unit that is selectively installed depending on the processing to be required. A processing device for rounding the corner portions of an object to be processed (for example, a name card), for perforating the paper sheet 100 in the lengthwise direction or in the widthwise direction, for creasing the paper sheet in the lengthwise direction, for cutting the paper sheet in the lengthwise direction, or for adding rollers to increase transfer capability is selectively incorporated in the first optional processing unit 20.

The first slitting unit 22 is used to cut the paper sheet 100 in the X-direction. The first slitting unit 22 is equipped with the pair of left and right slitting devices 22*a*, a widthwise positioning shaft 22*b*, and the slitter motor. The slitting device 22*a* is, for example, a slitting device 62 shown in FIG. 4 having a rotary upper blade 62*a* and a rotation shaft 62*b*, and a rotary lower blade 62*g* and a rotation shaft 62*h*, inside the casing thereof. A cutting line 60 is formed on the paper sheet 100 to cut the paper sheet 100 by the sliding engagement between the rotary upper blade 62*a* and the rotary lower blade 62*g* rotated using the rotation shafts 62*b* and 62*h*, respectively. The slitting devices 22*a* threadedly engaged with the widthwise positioning shaft 22*b* on which a thread is formed are moved in the Y-direction by rotating the widthwise positioning shaft 22*b* using the slitter motor. When the paper sheet 100 is not required to be cut, the slitting devices 22*a* are retracted to the outside of the paper transfer path 10. The movement and positioning of the slitting devices 22*a* in the Y-direction are controlled by the CPU 6 serving as controlling means.

Figure 4:
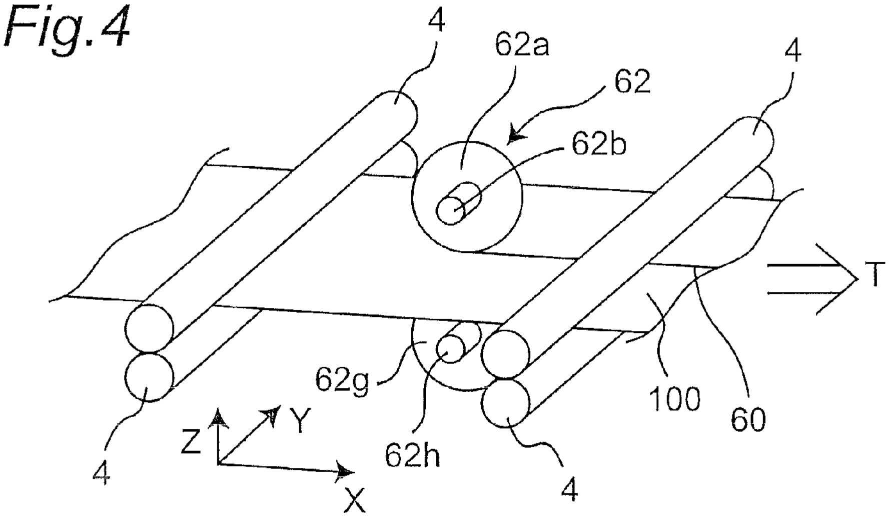
FIG. 4 is a view illustrating how cutting is performed in the slitting (lengthwise cutting) unit of the paper processing apparatus shown in FIG. 1.

The second slitting unit 24 and the third slitting unit 26 are also used to cut the paper sheet 100 in the X-direction using the slitting device 62 shown in FIG. 4, for example, and are configured in a manner similar to the above-mentioned first slitting unit 22. The number of cuts in the X-direction for the paper sheet 100 can be increased by additionally installing the slitting units.

Figure 2:
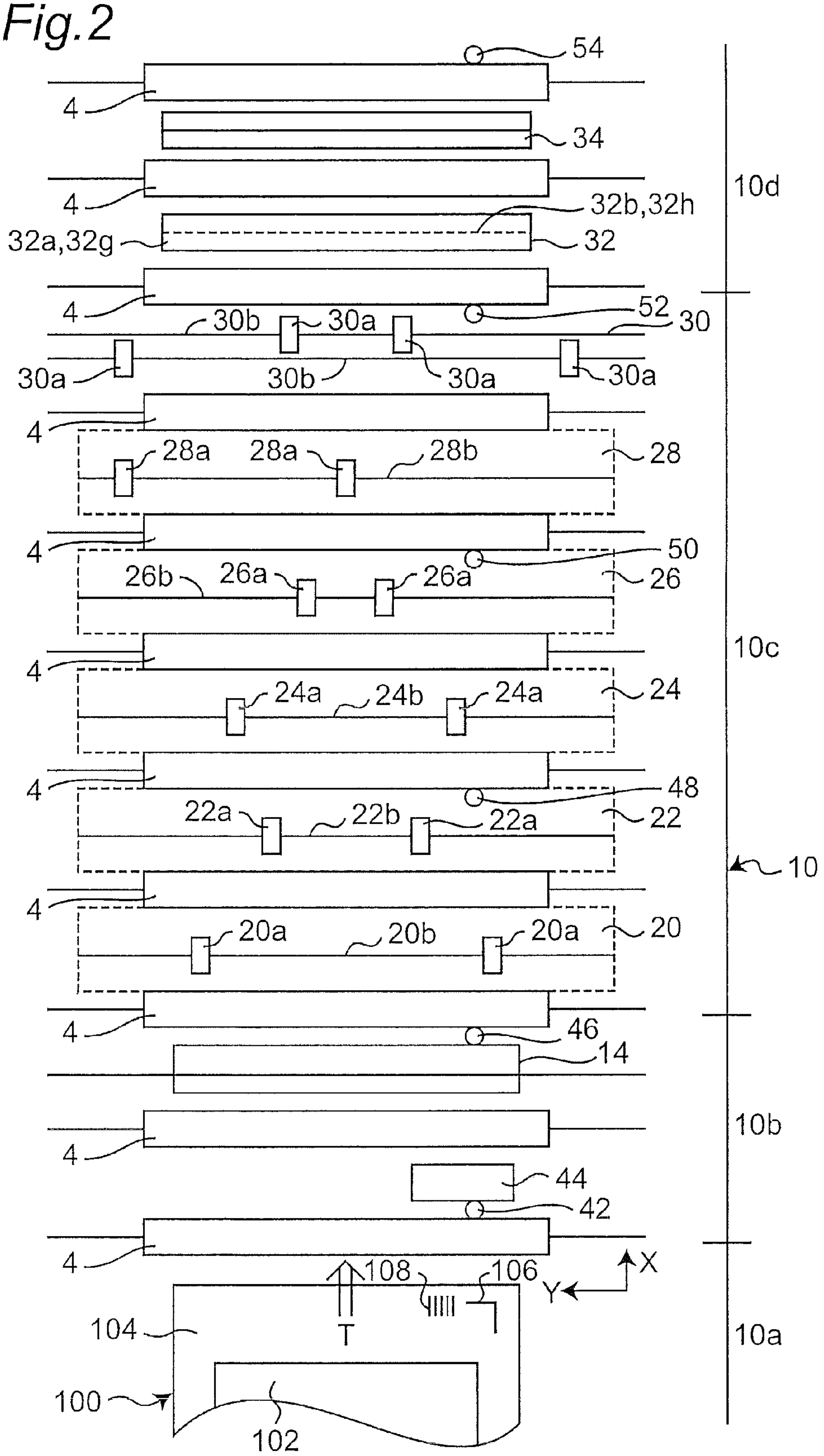
FIG. 2 is a schematic explanatory view showing the main section of the paper processing apparatus shown in FIG. 1, as viewed from above.

The second optional processing unit 28 is also a unit that is selectively installed depending on the processing to be required. A processing device for rounding the corner portions of an object to be processed (for example, a name card), for perforating the paper sheet 100 in the lengthwise direction, for creasing the paper sheet in the lengthwise direction, for cutting the paper sheet in the lengthwise direction, or for adding rollers to increase transfer capability is selectively incorporated in the second optional processing unit 28. Furthermore, in the case that the processing devices 20*a* and 28*b* (for example, each being formed of the slitting device 62 shown in FIG. 4) for performing cutting in the lengthwise direction are incorporated in the first optional processing unit 20 and the second optional processing unit 28, respectively, as shown in FIG. 2, the processing units 20 and 28 are equipped with the pair of left and right processing devices 20*a*, the pair of left and right processing devices 28*a*, the widthwise positioning shafts 20*b* and 28*b*, and the slitter motors, as in the case of the first slitting unit 22, for example.

The cutting wastage dropping section 30 is used to reject cutting wastage generated by the cutting in the slitting units 22, 24, and 26, for example, to the outside of the paper transfer path 10. The cutting wastage dropping section 30 is equipped with a plurality of cutting wastage dropping devices 30*a*, widthwise positioning shafts 30*b*, and a device moving motor. The device moving motor moves the cutting wastage dropping devices 30*a*, threadedly engaged with the widthwise positioning shafts 30*b* on which threads are formed, in the Y-direction, by rotating the widthwise positioning shafts 30*b*. Since the cutting wastage dropping devices (processing devices) 30*a* disposed at predetermined positions are placed as obstacles on the paper transfer path 10, the cutting wastage included in the paper sheet 100 is dropped and collected in a trash box 8 when the paper sheet 100 passes through the cutting wastage dropping section 30.

Figure 5:
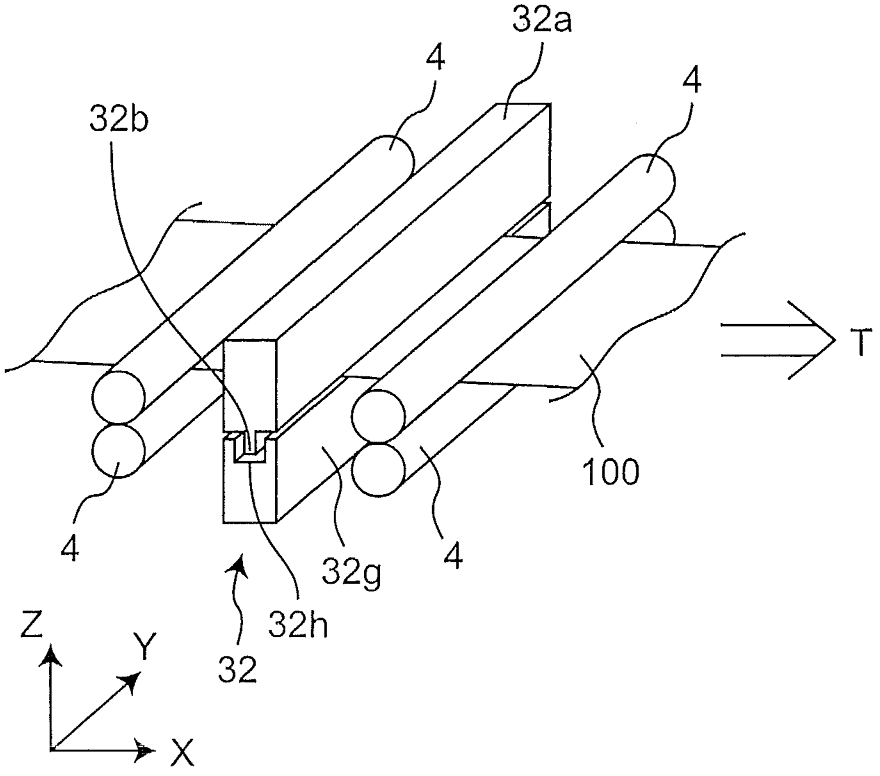
FIG. 5 is a view illustrating how creasing is performed in the creasing (widthwise folding) unit of the paper processing apparatus shown in FIG. 1.

The widthwise creasing section 32 is used to form a folded portion extending in the Y-direction on the paper sheet 100. In the widthwise creasing section 32, the creasing upper mold 32*a* and the creasing lower mold 32*g* (processing devices) extending in the Y-direction are disposed as shown in FIG. 5. In a state in which the paper sheet 100 is held between the creasing upper mold 32*a* and the creasing lower mold 32*g*, the creasing upper mold 32*a* is driven downward, and the convex section 32*b* of the creasing upper mold 32*a* presses the paper sheet 100 into the concave section 32*h* of the creasing lower mold 32*g*, whereby a nearly semicircular folded portion in cross section is formed on the paper sheet 100.

The widthwise cutting section 34 is used to form a cutting line extending in the Y-direction on the paper sheet 100. The widthwise cutting section 34 has an upper blade and a lower blade (cutting devices) extending in the Y-direction, and the upper blade is driven downward in a state in which the paper sheet 100 is held between the upper blade and the lower blade, whereby the paper sheet 100 is cut using the upper blade and the lower blade. Then, cutting wastage is dropped and collected in the trash box 8. In the case that the space portion to be cut in the X-direction is wide, the space portion can be divided into a plurality of narrow regions in the X-direction and can be cut into narrow pieces having a small width.

The processing device for rounding the corner portions of an object to be processed is configured, for example, so that a convex upper mold having a plurality of aligned blades of a nearly 90 degree arc shape is pressed against a lower mold having a flat plate shape.

Furthermore, a plurality of sensors are disposed at appropriate positions along the paper transfer path 10. In the embodiment shown in FIG. 1, the paper position detecting sensor 42, the CCD sensor 44, the first auxiliary position detecting sensor 46, the second auxiliary position detecting sensor 48, the third auxiliary position detecting sensor 50, the fourth auxiliary position detecting sensor 52, and the paper discharge detection sensor 54 are respectively disposed from the upstream side to the downstream side of the paper transfer path 10. The paper position detecting sensor 42, the first auxiliary position detecting sensor 46, the second auxiliary position detecting sensor 48, the third auxiliary position detecting sensor 50, the fourth auxiliary position detecting sensor 52, and the paper discharge detection sensor 54 are transmission optical sensors, each formed of a pair of lightemitting and light-receiving elements and used to detect the passage of the paper sheet 100 when the paper sheet 100 passes through the space between these elements.

Among the above-mentioned sensor group, the paper position detecting sensor 42 serving as paper position detecting means is disposed on the most upstream side of the paper transfer path 10. The paper position detecting sensor 42 detects the leading end or the trailing end of the paper sheet 100 fed from the paper-feeding tray 12 and held with the rollers 4, whereby the position of each paper sheet 100 being transferred on the paper transfer path 10 can be detected uniquely on the basis of the paper position detected using the paper position detecting sensor 42.

The lengthwise length of the paper sheet 100 is stored in the RAM according to the size information from the bar code 108 or input information from the operation panel. Hence, by the detection of either the leading end of the paper sheet 100 on the downstream side or the trailing end thereof on the upstream side, the position of the paper sheet 100 on the paper transfer path 10 (in particular, the trailing end position of each paper sheet 100) can be defined uniquely on the basis of the installation position of the paper position detecting sensor 42.

The CCD (charge coupled device) sensor 44 serving as information reading means for reading information relating to various kinds of processing operations to be performed for the paper sheet 100 is installed on the downstream side of the paper position detecting sensor 42 and on the upstream side of rejecting means 14. The CCD sensor 44 reads the image of the position mark 106 printed on the paper sheet 100 to detect the X-direction position and the Y-direction position of the position mark 106 and also reads the image of the bar code 108 printed on the paper sheet 100 to obtain the information of various kinds of processing to be performed for the paper sheet 100. Although a two-dimensional CCD for reading a planar image can also be used as the CCD sensor 44, its cost increases. Hence, the CCD sensor 44, formed of a one-dimensional CCD for reading an image by line scanning, is preferably used. In the case that the image of the bar code 108 is printed with ink containing magnetic components, a magnetic sensor for detecting the magnetic components can also be used as information reading means. When a paper sheet 100 whose information was unable to be read using the CCD sensor 44 because the position mark 106 or the bar code 108 printed thereon is unclear, the rejecting means 14 operates, and the paper sheet 100 whose information was unable to be read is dropped and collected in a rejection tray 16.

The position of each paper sheet 100 being transferred on the paper transfer path 10 can be detected uniquely using the paper position detecting sensor 42 as described above. However, the first auxiliary position detecting sensor 46, the second auxiliary position detecting sensor 48, the third auxiliary position detecting sensor 50, and the fourth auxiliary position detecting sensor 52 are auxiliarily disposed so as to be ready for a case in which the paper transfer path 10 becomes long and the lengthwise positional displacement (transfer error) of the paper sheet 100 on the paper transfer path 10 accumulates, thereby to correct the paper position information obtained using the paper position detecting sensor 42 and to make the paper position information more accurate.

The first auxiliary position detecting sensor 46 is disposed immediately in front of the rollers 4 disposed on the upstream side of the first optional processing unit 20. In addition, the second auxiliary position detecting sensor 48 is disposed immediately behind the downstream side of the first slitting unit 22. Furthermore, the third auxiliary position detecting sensor 50 is disposed immediately behind the downstream side of the third slitting unit 26. Moreover, the fourth auxiliary position detecting sensor 52 is disposed immediately in front of the rollers 4 disposed on the upstream side of the widthwise creasing section 32.

It is most preferable that the auxiliary position detecting sensors 48 and 50 should be disposed immediately behind the downstream sides of the slitting devices 22*a* and 26*a* constituting the first and third slitting units 22 and 26, respectively. However, it may sometimes be difficult to dispose the auxiliary position detecting sensors 48 and 50 at such appropriate positions in consideration of the installation of drive mechanisms and the maintenance thereof. In such a case, the auxiliary position detecting sensors 48 and 50 can be disposed on the downstream sides or the upstream sides of the slitting devices 22*a* and 26*a* instead of being disposed immediately behind the downstream sides thereof. Even if it is detected that a paper sheet 100 being transferred at high speed has actually passed through the auxiliary position detecting sensors 48 and 50, the paper sheet 100 cannot be stopped immediately at the moment of the detection (in other words, a slow-down distance is required until the paper sheet 100 stops). Hence, it is preferable that the auxiliary position detecting sensors 48 and 50 should be disposed on the upstream sides of the slitting devices 22*a* and 26*a* instead of being disposed immediately behind the downstream sides thereof in consideration of the slow-down distance.

Figure 6:
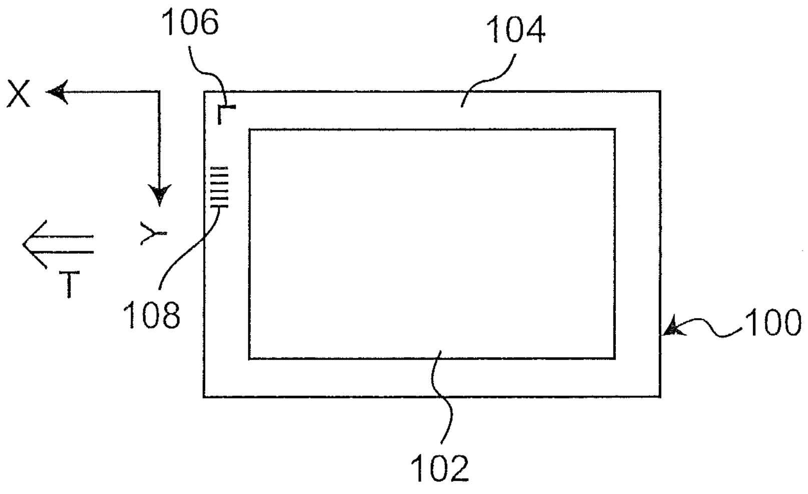
FIG. 6 is a plan view showing a paper sheet to be processed by the paper processing apparatus shown in FIG. 1.

The paper sheet 100 shown in FIG. 6 is loaded into the paper-feeding tray 12. A main printing section 102 is disposed in the central region of the paper sheet 100, and a margin section 104 is disposed around the main printing section 102. The paper-feeding tray 12 is configured so as to have a guide section (not shown) with which a side edge of the paper sheets 100 makes contact, so that the paper sheets 100 are loaded into the paper-feeding tray 12 with the side edge thereof being used as reference, and so that the paper sheets 100 are transferred sequentially along the paper transfer path 10, one by one.

The bar code 108 and the position mark 106 are printed at the leading end section of the paper sheet 100 on the downstream side.

The position mark 106 has a shape obtained by connecting a portion extending in the X-direction to a portion extending in the Y-direction so as to form an L-shape. On the basis of the image information read using the CCD sensor 44, the distance from the side edge being used as the reference for paper transfer to the portion of the position mark 106 extending in the X-direction is calculated, and a displacement amount from the reference position of the paper sheet 100 is calculated. Then, the positions relating to the processing in the lengthwise direction using the slitting units 22, 24 and 26, for example, are adjusted depending on the displacement amount. Furthermore, on the basis of the image information read using the CCD sensor 44, the distance from the leading end of the paper sheet 100 on the downstream side to the portion of the position mark 106 extending in the Y-direction is calculated, and on the basis of the difference between the calculated value and the value assumed for the bar code 108, the set value for the bar code 108 is corrected. Then, the processing positions relating to the widthwise processing using the widthwise creasing section 32 and the widthwise cutting section 34, for example, are determined depending on the amount of the correction.

The bar code 108 is a mark representing various kinds of information, such as the size information of the paper sheet 100 in the lengthwise direction and the widthwise direction, the position information of the position mark 106, the position information for various kinds of processing (cutting, perforating, corner cutting, and creasing) in the lengthwise direction, and the position information for various kinds of processing (cutting, perforating, corner cutting, and creasing) in the widthwise direction. Various kinds of information required for performing processing can be input by the user via the operation panel or a PC (personal computer).

Figure 7:
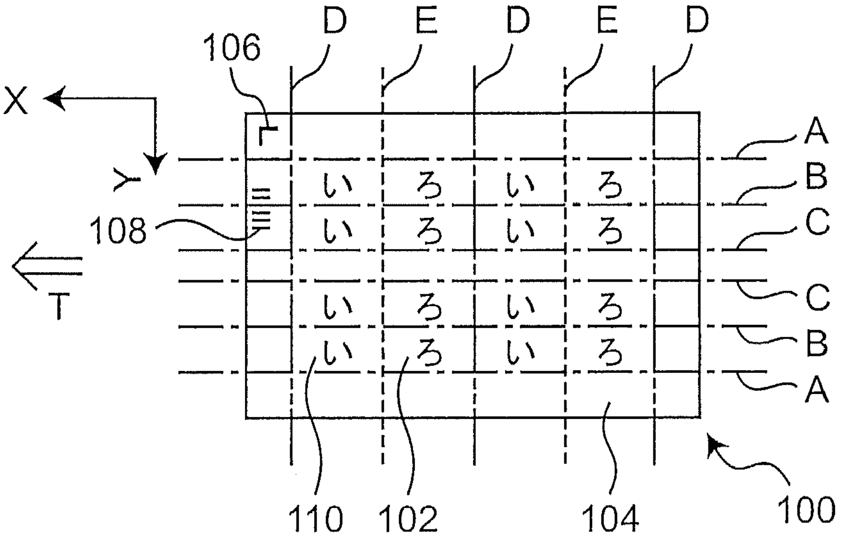
FIG. 7 is a view illustrating an example of processing information recorded on the paper sheet shown in FIG. 6.

For example, processing information instructing to perform the processing shown in FIG. 7 is recorded in the bar code 108 printed on a certain paper sheet 100. More specifically, in the bar code 108, the following processing information is recorded: information relating to lengthwise cutting performed along alternate long and short dash lines A, B and C (slit positions), information relating to widthwise cutting performed along an alternate long and two short dashes line D (cutting position), and information relating to widthwise folding performed along a broken line E (widthwise creasing position).

When the paper sheet 100 passes through the CCD sensor 44 on the paper transfer path 10, the processing information recorded on the bar code 108 is read. On the basis of the processing information, such various kinds of processing as exemplified in FIG. 7 are performed for the paper sheet 100, and eight folded cut pieces 110 are discharged into the paper-discharging tray 18.

Figure 8:
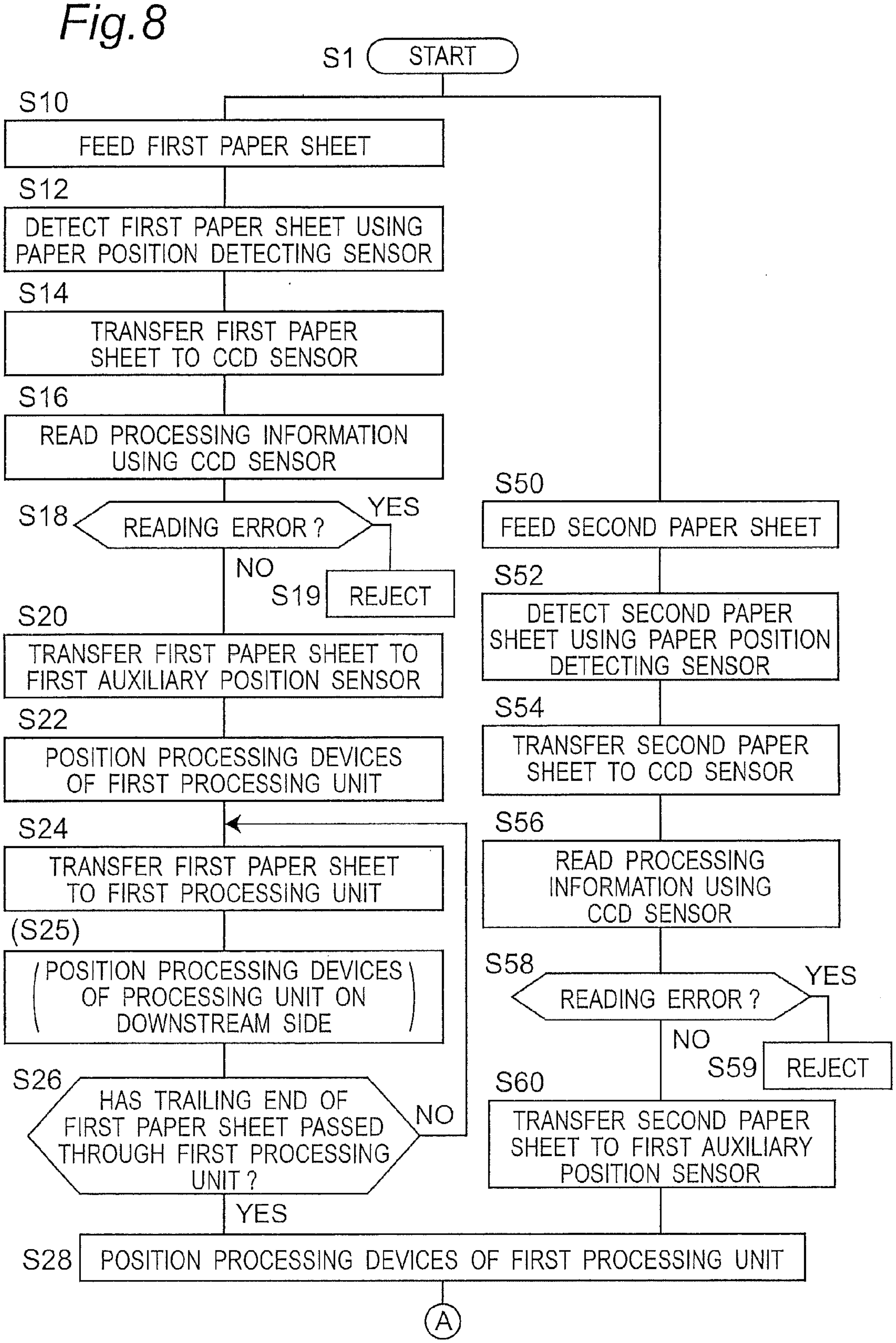
FIG. 8 is a flowchart showing the operation of the paper processing apparatus shown in FIG. 1.
Figure 9:
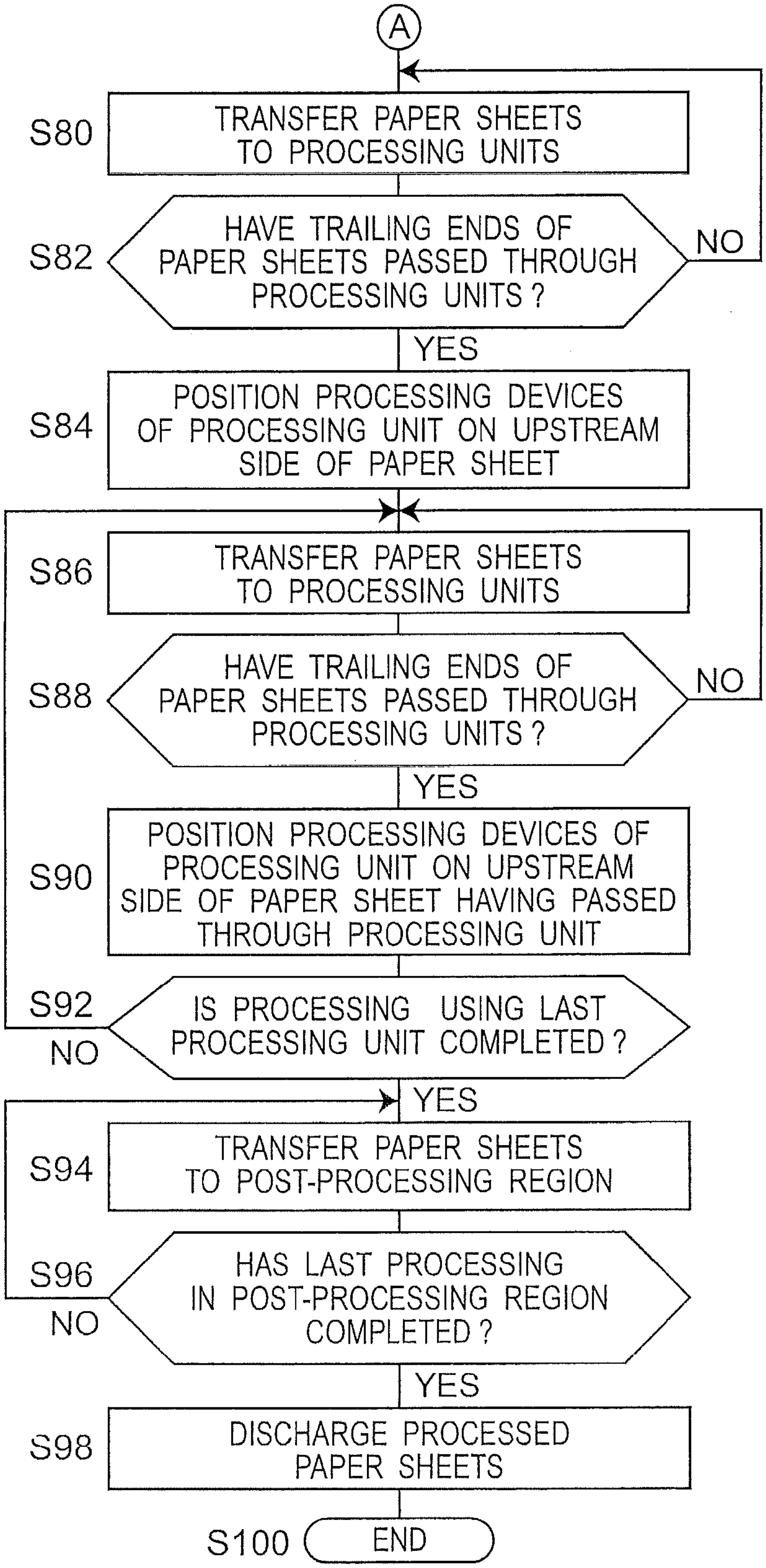
FIG. 9 is another flowchart showing the operation of the paper processing apparatus shown in FIG. 1.

Next, the operation of the paper processing apparatus 1 will be described referring to FIGS. 1, 8 and 9.

First, when the main power switch is turned on to start operation, various kinds of internal operation checking are performed. If there is no problem in the checking, the paper processing apparatus 1 is ready to start (at step S1). The paper sheets 100 loaded in the paper-feeding tray 12 are transferred to the paper-feeding region 10*a* of the paper transfer path 10, one by one (at step S10). In the paper-feeding region 10*a*, if the orientation of the transferred paper sheet 100 is slanted, correction is performed so that the orientation is straight. If the transferred paper sheets 100 are overlapped, the transfer of the paper sheets 100 is stopped. If the transfer of a certain paper sheet 100 (for example, a first paper sheet) is performed so that its orientation is straight, the paper sheet 100 (for example, the first paper sheet) is transferred to the next reading region 10*b*.

In the reading region 10*b*, the paper position detecting sensor 42 detects the leading end or the trailing end of the paper sheet 100 (for example, the first paper sheet) (at step S12). The paper sheet 100 is transferred stepwise to the position immediately before the position mark 106 and the bar code 108 of the paper sheet 100 (for example, the first paper sheet) are read using the CCD sensor 44 (at step S14). While the position of the leading end of the paper sheet 100, detected using the paper position detecting sensor 42, is used as a base point, the paper transfer speed is reduced to a speed at which line scanning is possible, before the reading position of the CCD sensor 44 is reached. Furthermore, the paper sheet 100 is transferred stepwise at the highest speed until the reduction of the paper transfer speed starts.

While the transfer of the paper sheet 100 is continued in a state in which the paper transfer speed is reduced to the speed at which line scanning using the CCD sensor 44 is possible and at the paper transfer speed being equal to the integral multiple of the line-scanning reading speed, the CCD sensor 44 line-scans the position mark 106 and the bar code 108 of the paper sheet 100 (for example, the first paper sheet) (at step S16). The information (the size information, position information, and processing information) relating to the paper sheet 100 (for example, the first paper sheet) and having been read is sent to the CPU 6 serving as controlling means and stored temporarily in the RAM. The CPU 6 carries out control to perform predetermined processing for the paper sheet 100 (for example, the first paper sheet) on the basis of the information. In the case that the CPU 6 judges that the position mark 106 and/or bar code 108 are printed unclearly and cannot be read (at step S18), the paper sheet 100 is dropped into the rejection tray 16 using the rejecting means 14 (at step S19).

The paper sheet 100 (for example, the first paper sheet) from which the above-mentioned information has been obtained properly is transferred to the first auxiliary position detecting sensor 46 at the highest speed (at step S20). The first auxiliary position detecting sensor 46 detects the leading end of the paper sheet 100 (for example, the first paper sheet) and checks for any lengthwise positional displacement (transfer error) of the paper sheet 100 (for example, the first paper sheet) on the paper transfer path 10. In the case that a lengthwise positional displacement (transfer error) is detected, the CPU 6 corrects the paper position information obtained using the paper position detecting sensor 42 to the paper position information obtained using the first auxiliary position detecting sensor 46. Then, on the basis of the processing information stored in the RAM, the CPU 6 carries out control to position the optional processing devices 20*a* of the first optional processing unit 20 disposed first in the preprocessing region 10*c* at predetermined widthwise positions (at step S22).

The paper sheet 100 (for example, the first paper sheet) is transferred stepwise at high speed to the first optional processing unit 20 disposed first in the preprocessing region 10*c*, and the optional processing devices 20*a* perform predetermined processing for the paper sheet 100 (for example, the first paper sheet) (at step S24). For example, the corner portions thereof are rounded using the first optional processing unit 20. While the paper sheet 100 (for example, the first paper sheet) is transferred stepwise at high speed, the CPU 6 monitors the position of the paper sheet on the paper transfer path 10 and checks whether the trailing end of the paper sheet 100 (for example, the first paper sheet) has passed through the first optional processing unit 20.

In the case that the preceding paper sheet 100 (for example, the first paper sheet) is a paper sheet to be transferred first, the fact that the leading end of the first paper sheet 100 has passed through the first optional processing unit 20 is detected uniquely on the basis of the paper position detecting sensor 42, and the CPU 6 carries out control to position the slitting devices 22*a* of the first slitting unit 22 disposed on the downstream side at predetermined widthwise positions (at step S25). Furthermore, according to the relationship between the X-direction (lengthwise) size of the paper sheet 100 (for example, the first paper sheet) and the X-direction (lengthwise) size of the lengthwise processing units 20, 22, 24, 26, and 28, the CPU 6 can perform control to position the slitting devices 24*a* of the second slitting unit 24 disposed on the downstream side of the first slitting unit 22, for example, at predetermined widthwise positions as necessary (at step S25). In other words, in the case that the preceding paper sheet 100 is the first paper sheet 100 and has a size extending along the arrangement of the plurality of lengthwise processing units 20, 22, 24, 26, and 28 in the X-direction (lengthwise direction), the CPU 6 carries out control so that before the leading end of the first paper sheet 100 enters a certain lengthwise processing unit, the positioning movement of the group of the lengthwise processing units on the downstream side including the certain lengthwise processing unit being in the state of immediately before the entry of the leading end has been completed.

In the case that the CPU 6 judges that the trailing end of the paper sheet 100 (for example, the first paper sheet) has not passed through the first optional processing unit 20 (at step S26), the paper sheet 100 (for example, the first paper sheet) is further transferred stepwise. In the case that the CPU 6 judges that the trailing end of the paper sheet 100 (for example, the first paper sheet) has passed through the first optional processing unit 20 (at step S26), the CPU 6 judges that the processing at the first optional processing unit 20 has been completed and carries out control to position the optional processing devices 20*a* of the first optional processing unit 20 at predetermined widthwise positions for the subsequent paper sheet 100 (for example, a second paper sheet) (at step S28), this step being overlapped with step 62 described later.

Concurrently with the detection of the leading end or the trailing end of the paper sheet 100 using the above-mentioned paper position detecting sensor 42 for the preceding paper sheet 100 (for example, the first paper sheet) at the above-mentioned step S12, the subsequent paper sheet 100 (for example, the second paper sheet) following the preceding paper sheet 100 (for example, the first paper sheet) is transferred to the paper-feeding region 10*a* of the paper transfer path 10 just as in the case of the preceding paper sheet 100 (for example, the first paper sheet) (at step S50). In the paper-feeding region 10*a*, if the orientation of the transferred paper sheet 100 is slanted, correction is performed so that the orientation is straight. If the transferred paper sheets 100 are overlapped, the transfer of the paper sheets 100 is stopped. If the transfer of the subsequent paper sheet 100 (for example, the second paper sheet) is performed so that its orientation is straight, the subsequent paper sheet 100 (for example, the second paper sheet) is transferred to the next reading region 10*b*.

In the reading region 10*b*, the paper position detecting sensor 42 detects the leading end or the trailing end of the subsequent paper sheet 100 (for example, the second paper sheet) (at step S52). The paper sheet 100 is transferred stepwise to the position immediately before the position mark 106 and the bar code 108 of the subsequent paper sheet 100 (for example, the second paper sheet) are read using the CCD sensor 44 (at step S54). While the position of the leading end of the paper sheet 100, detected using the paper position detecting sensor 42, is used as the base point, the paper transfer speed is reduced to the speed at which line scanning is possible, before the reading position of the CCD sensor 44 is reached. Furthermore, the paper sheet 100 is transferred stepwise at the highest speed until the reduction of the paper transfer speed starts.

While the transfer of the paper sheet 100 is continued in a state in which the paper transfer speed is reduced to the speed at which line scanning using the CCD sensor 44 is possible and at the paper transfer speed being equal to the integral multiple of the line-scanning reading speed, the CCD sensor 44 line-scans the position mark 106 and the bar code 108 of the subsequent paper sheet 100 (for example, the second paper sheet) (at step S56). The information (the size information, position information, and processing information) relating to the subsequent paper sheet 100 (for example, the second paper sheet) and having been read is sent to the CPU 6 serving as controlling means and stored temporarily in the RAM. The CPU 6 carries out control to perform predetermined processing for the subsequent paper sheet 100 (for example, the second paper sheet) on the basis of the information. In the case that the CPU 6 judges that the position mark 106 and/or bar code 108 are printed unclearly and cannot be read (at step S58), the paper sheet 100 is dropped into the rejection tray 16 disposed downward using the rejecting means 14 (at step S59).

The subsequent paper sheet 100 (for example, the second paper sheet) from which the information has been obtained properly using the CCD sensor 44 is transferred stepwise to the first auxiliary position detecting sensor 46 at the highest speed (at step S60). The first auxiliary position detecting sensor 46 detects the leading end of the subsequent paper sheet 100 (for example, the second paper sheet) and checks for any lengthwise positional displacement (transfer error) of the subsequent paper sheet 100 (for example, the second paper sheet) on the paper transfer path 10. As described at step S28 for the preceding paper sheet 100 (for example, the first paper sheet), the CPU 6 corrects the paper position information obtained using the paper position detecting sensor 42 to the paper position information obtained using the first auxiliary position detecting sensor 46. On the basis of the processing information stored in the RAM, the CPU 6 carries out control to position the optional processing devices 20*a* of the first optional processing unit 20 disposed first in the preprocessing region 10*c* at predetermined widthwise positions (at step S28).

Hence, the slitting devices 22*a* of the first slitting unit 22 are controlled so as to be positioned at the predetermined widthwise positions for the preceding paper sheet 100 (for example, the first paper sheet). Furthermore, as the trailing end of the preceding paper sheet 100 passes through the first optional processing unit 20, the optional processing devices 20*a* of the first optional processing unit 20 are controlled so as to be positioned at the predetermined widthwise positions for the subsequent paper sheet 100 (for example, the second paper sheet). Moreover, the preceding paper sheet 100 (for example, the first paper sheet) is away from the subsequent paper sheet 100 (for example, the second paper sheet) by a distance corresponding to the X-direction (lengthwise) size of the cutting unit 20, for example.

The preceding paper sheet 100 (for example, the first paper sheet) and the subsequent paper sheet 100 (for example, the second paper sheet) being away from each other by the predetermined distance in the preprocessing region 10*c* are respectively transferred stepwise concurrently at high speed to the processing units (at step S80). Predetermined processing is performed concurrently for the preceding paper sheet 100 (for example, the first paper sheet) and the subsequent paper sheet 100 (for example, the second paper sheet). For example, for the preceding paper sheet 100 (for example, the first paper sheet), slitting is performed using the first slitting unit 22, for example, and for the subsequent paper sheet 100 (for example, the second paper sheet), the corner portions thereof are rounded using the first optional processing unit 20.

While a group of paper sheets 100 (for example, the first paper sheet and the second paper sheet) is transferred stepwise at high speed, the CPU 6 monitors the positions of the group of paper sheets 100 on the paper transfer path 10 and checks whether the trailing ends of the group of paper sheets 100 (for example, the first paper sheet and the second paper sheet) have respectively passed through the first slitting unit 22 and the first optional processing unit 20. In the case that the CPU 6 judges that the trailing ends of the group of paper sheets 100 (for example, the first paper sheet and the second paper sheet) have respectively not passed through the first slitting unit 22 and the first optional processing unit 20 (at step S82), the group of paper sheets 100 (for example, the first paper sheet and the second paper sheet) is further transferred stepwise. In the case that the CPU 6 judges that the trailing ends of the group of paper sheets 100 (for example, the first paper sheet and the second paper sheet) have respectively passed through the first slitting unit 22 and the first optional processing unit 20 (at step S82), the CPU 6 judges that the processing at the first slitting unit 22 and the processing at the first optional processing unit 20 have respectively been completed and carries out control to position the slitting devices 22*a* of the first slitting unit 22 on the downstream side at predetermined widthwise positions for the subsequent paper sheet 100 (for example, the second paper sheet) (at step S84).

The preceding paper sheet 100 (for example, the first paper sheet) and the subsequent paper sheet 100 (for example, the second paper sheet) being away from each other by the predetermined distance on the preprocessing region 10*c* are respectively transferred stepwise concurrently at high speed to the processing units (at step S86). Predetermined processing is performed concurrently for the preceding paper sheet 100 (for example, the first paper sheet) and the subsequent paper sheet 100 (for example, the second paper sheet). For example, for the preceding paper sheet 100 (for example, the first paper sheet), slitting is performed using the second slitting unit 24, for example, and for the subsequent paper sheet 100 (for example, the second paper sheet), slitting is performed using the first slitting unit 22.

While the group of paper sheets 100 (for example, the first paper sheet and the second paper sheet) is transferred stepwise at high speed, the CPU 6 monitors the positions of the group of paper sheets 100 on the paper transfer path 10 and checks whether the trailing ends of the group of paper sheets 100 (for example, the first paper sheet and the second paper sheet) have respectively passed through the second slitting unit 24 and the first slitting unit 22. In the case that the CPU 6 judges that the trailing ends of the group of paper sheets 100 (for example, the first paper sheet and the second paper sheet) have respectively not passed through the second slitting unit 24 and the first slitting unit 22 (at step S88), the group of paper sheets 100 (for example, the first paper sheet and the second paper sheet) is further transferred. In the case that the CPU 6 judges that the trailing ends of the group of paper sheets 100 (for example, the first paper sheet and the second paper sheet) have respectively passed through the second slitting unit 24 and the first slitting unit 22 (at step S88), the CPU 6 judges that the processing at the second slitting unit 24 and the processing at the first slitting unit 22 have been completed and carries out control to position the slitting devices 24*a* of the second slitting unit 24 on the downstream side at predetermined widthwise positions for the subsequent paper sheet 100 (for example, a second paper sheet) (at step S90).

After the above-mentioned sequence of processing in the lengthwise direction is repeated, the CPU 6 judges whether the processing using the last processing unit (for example, the cutting wastage dropping section 30) in the X-direction (lengthwise direction) for the first paper sheet among the group of paper sheets 100, for example, has been completed (at step S92). If the last processing in the X-direction (lengthwise direction) has not been completed, similar processing is repeated. If the last processing in the X-direction (lengthwise direction) has been completed, the processing shifts to the next Y-direction (widthwise) post-processing.

The Y-direction (widthwise) post-processing for the paper sheet 100 (for example, the first paper sheet) is performed in the post-processing region 10*d*. Paper transfer in the post-processing region 10*d* is performed using a drive source different from the preprocessing transfer motor, that is, the post-processing transfer motor. On the basis of the paper position information (renewed paper position information in the case that the initial paper position information has already been renewed) stored in the RAM, the CPU 6 can determine the position of the paper sheet 100 (for example, the first paper sheet) in the post-processing region 10*d*. However, the fourth auxiliary position detecting sensor 52 auxiliarily installed to improve the accuracy of positioning detects the leading end of the paper sheet 100 (for example, the first paper sheet) to be subjected to the Y-direction (widthwise) post-processing and checks whether there is any lengthwise positional displacement (transfer error) of the paper sheet 100 (for example, the first paper sheet).

In the case that a lengthwise positional displacement (transfer error) of the paper sheet 100 (for example, the first paper sheet) is detected, the CPU 6 corrects the paper position information stored in the RAM to the paper position information obtained using the fourth auxiliary position detecting sensor 52. Then, the paper sheets 100 (for example, the first paper sheet and the second paper sheet) are transferred stepwise to a post-processing section (at step S94). On the basis of the corrected paper position information and the processing information, widthwise creasing is performed for the paper sheet 100 (for example, the first paper sheet) using the creasing convex mold 32*a* and concave mold 32*g* of the widthwise creasing section 32 first disposed as the post-processing section.

The CPU 6 judges whether the last processing using the last Y-direction (widthwise) post-processing section (for example, the widthwise cutting section 34) for the widthwise creased paper sheet 100 (for example, the first paper sheet) has been completed (at step S96). If the Y-direction (widthwise) last processing using the upper blade and the lower blade of the widthwise cutting section 34 for cutting the paper sheet 100 subjected to various kinds of processing has not been completed, the processing is repeated until the last Y-direction (widthwise) processing is completed.

In the case that the last processing using the last Y-direction (widthwise) post-processing section (for example, the widthwise cutting section 34) has been completed, the cut pieces 110 obtained by the last processing using the last Y-direction (widthwise) post-processing section (for example, the widthwise cutting section 34) are transferred to the paper-discharging tray 18 (at step S98). Consequently, the sequence of processing for the paper sheet 100 (for example, the first paper sheet) has been completed (at step S100).

Although various processing procedures, such as the transfer and processing relating to the first paper sheet and the second paper sheet used as the paper sheets 100, have been described, a third paper sheet following the second paper sheet and a fourth paper sheet following the third paper sheet, for example, are transferred and processed sequentially using similar processing procedures. Hence, in the preprocessing region 10*c* of the paper transfer path 10, the first paper sheet and the second paper sheet, the second paper sheet and the third paper sheet or the third paper sheet and the fourth paper sheet, for example, are transferred while a constant interval (for example, a distance corresponding to the X-direction (lengthwise) size of the cutting units 20, 22, 25, 26, and 28) is maintained therebetween. Furthermore, this kind of step is repeated for a predetermined number of paper sheets 100 or all the paper sheets 100 loaded in the paper-feeding tray 12, and the processing for all the paper sheets 100 required to be processed is completed.

Consequently, with the paper processing apparatus 1 according to the present invention, if the CPU 6 serving as controlling means judges that a certain paper sheet 100 has passed through a certain processing unit on the basis of the paper position detected using the paper position detecting sensor 42, the CPU 6 carries out control to adjust the widthwise positions of the processing devices of the certain processing unit so that the positions are adapted to the processing operation for the next paper sheet. Hence, the paper sheets 100 to be processed sequentially can be transferred sequentially at short intervals, and there is an effect that processing capability per time is enhanced.

The present invention is not limited to the above-mentioned embodiment but can be embodied in various forms. For example, although the five detachable processing units 20, 22, 24, 26, and 28 are used as processing means for performing X-direction (lengthwise) processing for the paper sheet 100, the numbers of the X-direction (lengthwise) processing means to be disposed, the arrangement sequence thereof and the processing devices thereof can be changed appropriately depending on the desired processing. This is similarly applicable to the Y-direction (widthwise) processing sections. Furthermore, the positions of the auxiliary position detecting sensors 46, 48, 50, and 52 and the numbers thereof to be disposed can also be changed appropriately depending on the processing means to be used. Furthermore, although the auxiliary position detecting sensors 46, 48, 50, and 52 are installed to detect the lengthwise positional displacement (transfer error) of the paper sheet 100 in the above-mentioned embodiment, it is possible to have a configuration in which the position of each paper sheet 100 being transferred on the paper transfer path is detected uniquely on the basis of only the position of the paper sheet detected using the paper position detecting sensor 42, without installing the auxiliary position detecting sensors 46, 48, 50, and 52.

In the present invention, the processing devices 20*a*, 22*a*, 24*a*, 26*a*, and 28*a* capable of being moved widthwise and positioned widthwise are used to perform lengthwise cutting, lengthwise perforating, lengthwise creasing or corner cutting (rounding for the Corner portions of an object to be processed). The processing devices 20*a*, 22*a*, 24*a*, 26*a*, and 28*a* capable of being positioned widthwise are moved so as to be positioned widthwise in a state in which no paper sheet 100 is present in the processing units, that is, in a state in which no paper sheet 100 is held between the processing devices.

EXPLANATIONS OF LETTERS AND NUMERALS

1 paper processing apparatus
2 apparatus body
4 roller.
6 CPU (controlling means)
8 trash box
10 paper transfer path
10*a* paper-feeding region
10*b* reading region
10*c* preprocessing region
10*d* post-processing region
12 paper-feeding tray
14 rejecting means
16 rejection tray
18 paper-discharging tray
20 first optional processing unit
20*a* optional processing device
20*b* widthwise positioning shaft
22 first slitting (lengthwise cutting) unit
22*a* slitting device
22*b* widthwise positioning shaft
24 second slitting (lengthwise cutting) unit
24*a* slitting device
24*b* widthwise positioning shaft
26 third slitting (lengthwise cutting) unit
26*a* slitting device
26*b* widthwise positioning shaft
28 second optional processing unit
28*a* optional processing device

28*b* widthwise positioning shaft
30 cutting wastage dropping section
30*a* cutting wastage dropping devices
30*b* widthwise positioning shaft
32 widthwise creasing (widthwise folding) section
32*a* creasing upper mold
32*b* convex section
32*g* creasing lower mold
32*h* concave section
34 widthwise cutting section
42 paper position detecting sensor
44 CCD sensor (information reading means)
46 first auxiliary position detecting sensor
48 second auxiliary position detecting sensor
50 third auxiliary position detecting sensor
52 fourth auxiliary position detecting sensor
54 paper discharge detection sensor
60 cutting line
62 slitting device
62*a* rotary upper blade
62*b* rotation shaft
62*g* rotary lower blade
62*h* rotation shaft
100 paper sheet
102 main printing section
104 margin section
106 position mark
108 bar code
110 cut pieces
A slitting position
B slitting position
C slitting position
D cutting position
E widthwise creasing position
T paper transfer direction

The invention claimed is:

1. A paper processing apparatus comprising:

a paper transferor for sequentially transferring paper sheets along a paper transfer path while maintaining a predetermined interval between a certain paper sheet and a next paper sheet, a paper position detector for detecting a position of a paper sheet on the paper transfer path by detecting a leading end or a trailing end of the paper sheet supplied from a paper feeder, a plurality of processors, disposed on the paper transfer path, for performing predetermined processing to the paper sheet, an information reader for reading information relating to processing to be performed for the paper sheet using the processors, and a controller for controlling operations relating to the paper transferor, the paper position detector, the plurality of processors, and the information reader, wherein:

upon judging that the trailing end of the certain paper sheet has passed through a certain processor on the basis of the position of the paper sheet detected using the paper position detector, the controller carries out adjustment of the widthwise position of the certain processor for the next paper sheet so as to be adapted for the processing for the next paper sheet on the basis of processing information relating to the next paper sheet obtained before the predetermined processing is performed using the certain processor.

2. The paper processing apparatus according to claim 1, wherein the paper position detector is disposed on the upstream side of the information reader.

3. The paper processing apparatus according to claim 2, wherein an auxiliary paper position detector is disposed appropriately in a leading end section or a trailing end section of the processors.

4. The paper processing apparatus according to claim 1, wherein an auxiliary paper position detector is disposed appropriately in a leading end section or a trailing end section of the processors.

5. The paper processing apparatus according to claim 1, wherein paper transfer drive sources for the paper feeder, the information reader, and the processors are independent of one another.

6. The paper processing apparatus according to claim 1, wherein the reading operation using the information reader is performed while the paper sheet is transferred.

7. The paper processing apparatus according to claim 1, wherein:

the paper transfer using the paper transferor is performed at the highest speed until the leading end or the trailing end of the paper sheet is detected using the paper position detector, and the paper transfer using the paper transferor is performed in a state in which the transfer speed is reduced to a speed at which reading using the information reader is possible after the leading end or the trailing end of the paper sheet is detected using the paper position detector.

8. The paper processing apparatus according to claim 1, wherein the processors are configured as so as to be detachable from the body of the apparatus.

* * * * *